United States Patent [19]

Hollifield

[11] Patent Number: 5,032,043
[45] Date of Patent: Jul. 16, 1991

[54] SPINDLE ADAPTER FOR TOOL HOLDER WITH TOOL ADJUSTMENT CONTROL

[75] Inventor: H. D. Hollifield, Mt. Clemens, Mich.

[73] Assignee: T. M. Smith Tool International Corporation, Mt. Clemens, Mich.

[21] Appl. No.: 544,907

[22] Filed: Jun. 28, 1990

[51] Int. Cl.⁵ .............................................. B23B 31/02
[52] U.S. Cl. ................................... 409/234; 279/1 E; 279/48; 408/146; 408/239 A
[58] Field of Search ............... 279/1 E, 1 TE, 42, 48, 279/49, 52, 53, 54, 55, 56, 59; 408/239 A, 146, 186; 409/204, 232, 234

[56] References Cited

U.S. PATENT DOCUMENTS

| | | | |
|---|---|---|---|
| 1,037,799 | 9/1912 | Schafer | 279/1 E |
| 1,788,268 | 1/1931 | Anderson | 279/1 E |
| 2,430,997 | 11/1947 | Schmidt, Jr. | 408/146 |
| 2,785,903 | 3/1957 | Lassy | 279/1 E |
| 3,202,433 | 8/1965 | Davis | 408/146 |
| 4,710,079 | 12/1987 | Smith et al. | 279/75 |
| 4,834,596 | 5/1989 | Hollifield et al. | 279/1 T |

FOREIGN PATENT DOCUMENTS 191734   9/1985   Japan .................................. 409/234

Primary Examiner—Daniel W. Howell
Attorney, Agent, or Firm—Dykema Gossett

[57] ABSTRACT

A tool holder and spindle adapter includes a quick change section for securing into a power spindle, a body having an axial bore mounting a positive drive and a collet holder shank to receive a tool holder collet and tool, with the tool extending into operative engagement with the positive drive. A rotatable tool adjuster is mounted within the body upon a transverse axis and includes an eccentric cam device engageable with the positive drive for controlling longitudinal in and out adjustments of the tool.

7 Claims, 1 Drawing Sheet

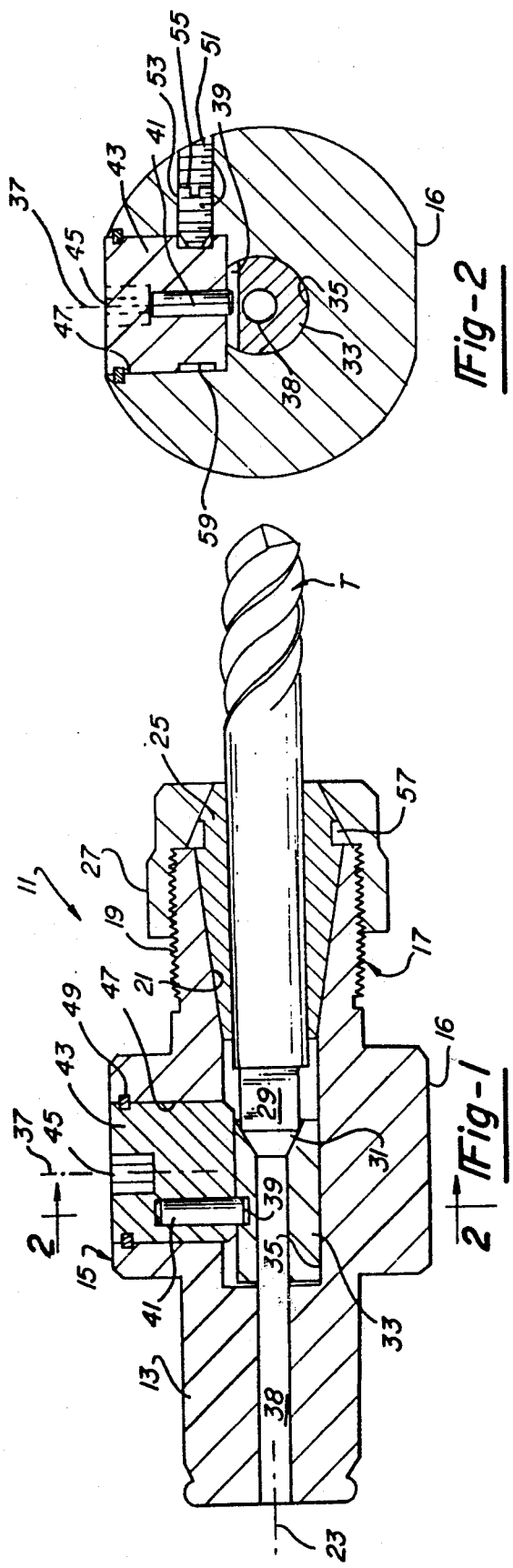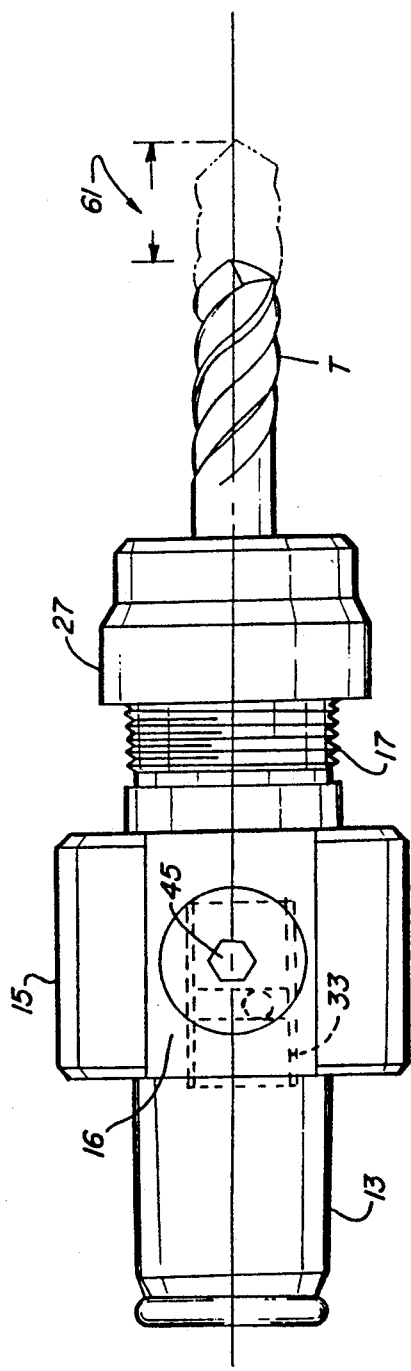

SPINDLE ADAPTER FOR TOOL HOLDER WITH TOOL ADJUSTMENT CONTROL

FIELD OF THE INVENTION

In the area of quick change tool holders and spindle adapters for mounting within a power driven spindle, means for regulating longitudinal adjustments of a cutting tool relative to the tool holder.

BACKGROUND

Previously, in connection with the use of quick change tool holders and spindle adapters adapted for securing into a power spindle and including a collet holder shank adapted to receive a collet and a tool, the tool normally extends axially into the body of the quick change tool holder and into operative engagement with a positive drive therein. Previously, the positive drive, normally in operative engagement with the inner end of the tool is adapted for longitudinal adjustments within the body of the tool holder by application of a tool or a screw driver to one end of the positive drive for rotating the positive drive which threadedly engages an internal bore of the body for advancing or retracting the positive drive longitudinally. In order to effect such longitudinal adjustments of the positive drive, it is necessary that the quick change tool holder be removed from the spindle and its axial bore be accessible to a tool such as a screw driver or other tool for rotating the positive drive. This adjusts the position of the tool inwardly and outwardly of the tool holder.

THE PRIOR ART

This is shown in applicant's assignees' U.S. Pat. Nos. 4,710,079 and 4,834,596, entitled Quick Change Spindle Adapter for Tool Holder.

SUMMARY OF THE INVENTION

An important feature of the present invention is to provide for a quick change holder and spindle adapter which includes a quick change section for securing into a power spindle, a body having an axial bore for mounting a positive drive and a collet holder shank to receive a tool holder collet and tool with the tool extending into operative engagement with the positive drive all upon a longitudinal axis. A rotatable tool adjuster is mounted within the body upon a transverse axis and incldues an eccentric connection to the positive drive so that selected rotary adjustments of the tool adjuster are adapted to control longitudinal in and out adjustments of the tool relative to the holder.

Another feature is to provide with the rotatable tool adjuster and interconnecting the rotatable tool adjuster and the positive drive, an eccentric cam connection wherein selected rotary adjustments of the tool adjuster are adapted to effect corresponding selective longitudinal adjustments of the positive drive and the tool bearing thereagainst.

Another feature is to provide within the body of the quick change tool holder and spindle adapter a longitudinal bore on a first axis within which is reciprocally positioned a positive drive together with a selectively rotatable tool adjuster mounted within the body and rotatable on a second transverse axis at right angles to the first axis together with a cam means interconnecting the rotatable adjuster and the positive drive such that movement of the rotatable adjuster in one of two directions selectively effects corresponding longitudinal adjustments of the power drive within the body. This controls corresponding longitudinal movements of the tool relative to the body.

As another feature, a yieldable locking means is interposed between the rotatable tool adjuster and the body such that it is free for rotation upon its transverse axis yet constrained against outward movement relative to the body.

There is a further object to eccentrically mount upon the rotatable tool adjuster a drive pin which depends from the rotatable adjuster on an axis laterally displaced from the axis of rotation of the rotatable adjuster and thus eccentric thereto with an end portion thereof projecting therefrom and extending within a transverse slot in the surface of the positive drive.

These and other features and objects will be seen from the following specification and claims in conjunction with the appended drawing.

THE DRAWING

FIG. 1 is a longitudinal section of the present tool holder and spindle adapter shown double actual size and illustrates the radial rotative adjuster upon the tool body and its eccentric connection to the positive drive for the cutting tool.

FIG. 2 is a transverse section taken in the direction of arrows 2—2 of FIG. 1.

FIG. 3 is a plan view thereof.

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

Referring to the drawing, the present tool holder and spindle adapter with tool adjuster is generally indicated at 11 FIG. 1. The present tool holder includes a quick change section 13, generally cylindrical having a first longitudinal axis 23 and adapted for axially projecting and securing within a conventional power rotated spindle, not shown, and suitably keyed thereto for rotation in unison.

The quick change section 13 terminates in the cylindrical body 15 having top and bottom flats 16 and an internal axial bore 35. Body 15 adjacent one end terminates in the collet holder shank 17 which is externally threaded at 19 and has an inwardly converging or tapered bore 21 which communicates with bore 35 within body 15.

The collet holder shank 17 is also arranged upon longitudinal axis 23 and is adapted to receive the similarly tapered collet 25 through which axially projects the cutting tool T. Tool T is axially positioned within the collet in a conventional manner and wherein the tool at its rectangular inner end 29, FIG. 1, extends into the wedge shaped recess 31 on one end of the tool adjustment member or positive drive 33, nested within bore 35.

The positive drive 33, sometimes referred to as positive drive member, is movably positioned within bore 35 and is adapted for longitudinal adjustment therein. This is for controlling or regulating corresponding in and out longitudinal adjustments of the tool T.

The collet nut 27 includes an internal annular flange 57 which is rotatively nested within a corresponding annular recess in the collet 25 and is adapted to engage the threads 19 upon the collet holder shank 17. This is for the purpose of gripping and tightly anchoring the tool T within the collet 25 and with respect to the adjacent collet holder shank 17, forming a part of the present quick change tool holder 13, 15.

The rotative tool adjuster 43 sometimes referred to as tool adjustment control mechanism, is of general cylindrical form and is nested within the radial bore 47 in body 15. It is arranged upon an axis 37 at right angles to the first axis 23 and at its inner end bears against the positive drive 33.

Rotary tool adjuster 43 is restrained within the bore 47 by a conventional snap ring 49 to prevent accidental separation of the adjuster from body 15. At the same time the locking ring 49 maintains the inner end portion of the rotary adjuster 43 adjacent and against the rotative or positive drive 33.

To facilitate rotative movement of tool adjuster 43 axially thereof at its top is an Allan socket 45 adapted to receive an Allan wrench to facilitate selected and limited manual rotation. There is provided between tool adjuster 43 and positive drive 33 an eccentric connection whereby rotation of the tool adjuster 43 is adapted to effect selected longitudinal adjustments of the positive drive 33 in one of two directions. This effects corresponding longitudinal outward adjustments of tool T, and permits selectively manual inward adjustments.

For this purpose, there is provided within the rotative tool adjuster 43 and within a bore on an axis laterally displaced from the transverse axis of the rotary adjuster an eccentric pin 41 secured thereto with its inner end projecting from the rotary adjuster 43 and into a transverse slot 39 formed across the top of positive drive 33.

By this construction upon loosening of the collet nut 27 to free up the tool T with respect to the collet 25 limited preselected rotary adjustments of the tool adjuster 43 through the eccentric pin 41 are adapted to effect selective longitudinal in or out adjustments of the positive drive 33 inwardly and outwardly within the bore 35. This is adapted to effect a longitudinal outward movement of tool T. Correspondingly a rotation in the opposite direction causes a retraction of the positive drive 33 which serves as a control limiting inward adjustment movements of the tool T manually against the conical surface 31.

Once the tool adjuster 43, has been properly rotated setting the length of the tool T for a particular cutting, drilling or boring operation, the adjuster is frictionally locked in position by adjustment of the set screw 51. The set screw is adjustably positioned within the bore 53 at right angles to axis 37. Its inner end rests within an annular grove 59 in adjuster 43. In one position the set screw frictionally engages the rotative adjuster 43 anchoring it against accidental rotation. In another position it releases the rotary adjuster 43.

In the referred embodiment set screw 51 includes an Allan socket 55. Limited rotation of the set screw moves it out of frictional engagement with rotative adjuster 43.

There is shown in dotted lines at 61, FIG. 3, the approximate amount of range of adjustment provided by the rotary tool adjuster 43 for the tool T. This is in the range approximately of 0.370 to 0.380 inches. Depending upon the needs this range could be modified. It may depend upon other dimensions of the respective parts including the rotative adjuster 43, the pin 41 and the control slot 39 within the rotative positive drive 33.

The foregoing construction provides an easy means by which there is provided for longitudinal adjustment of the tool without access endwise of the tool holder as has been the case in the past. This normally required the application of a tool such as a wrench or screw driver or the like into an axial bore 38 within section 13.

Having described my invention, reference should now be had to the following claims.

I claim:

1. A tool holder and spindle adapter comprising a quick change section having a first longitudinal axis adapted for axial mounting and securing within a power rotated spindle;

a body on said quick change section having an axial bore;

a positive drive positioned within said bore for selected longitudinal adjustments in said body; there being a transverse slot across the top of said positive drive;

a collet holder shank extending from said body arranged upon said axis;

a collet axially mounting a cutting tool extending into said collet holder shank and adjustably secured thereto for anchoring said cutting tool in said shank;

the inner end of said cutting tool being in operative engagement with said positive drive;

there being a radial bore in said body extending to said axial bore;

a tool adjuster nested and retained within said radial bore for rotation on a second axis at about right angles to said first axis;

a cam pin mounted within said tool adjuster upon a third axis eccentric to, spaced from and parallel to said second axis, with one end of said pin projecting from said adjuster and into said transverse slot operatively engaging said positive drive; and selective adjustment of said tool adjuster upon release of said collet effecting corresponding longitudinal adjustments of said positive drive within said body, and corresponding longitudinal adjustments of said tool.

2. In the tool holder of claim 1, further comprising said rotative tool adjuster and radial bore having communicating annular recesses; and a snap ring nested within said such recesses retaining said tool adjuster against radial outward movement relative to said body while free for rotary adjustments.

3. In the tool holder of claim 1, further comprising wrench engaging means on said tool adjuster for facilitating rotary adjustments thereof.

4. In the tool holder of claim 1, further comprising a locking means including a set screw arranged upon an axis at right angles to said second axis, threaded into said body, there being an annular grove in said tool adjuster; and said set screw extending into said grove and operably engaging said tool adjuster, preventing accidental and unintended rotary movements thereof.

5. In the tool holder of claim 1, further comprising movement of said tool adjuster in one direction advancing said cutting tool longitudinally outward of said collet holder shank; and rotation in the opposite direction permitting manual movement of said tool axially inward of said shank.

6. A tool holder and spindle adapter comprising a quick change section having a first longitudinal axis adapted for axial mounting and securing within a power rotated spindle;

a body on said quick change section having an axial bore;

a positive drive positioned within said bore for selected longitudinal adjustments in said body;

a collet holder shank extending from said body arranged upon said axis;

a collet axially mounting a cutting tool extending into said collet holder shank and adjustably secured thereto for anchoring said cutting tool in said shank;

the inner end of said cutting tool being in operative engagement with said positive drive;

a tool adjuster nested and retained within said body for rotation on a second axis at about right angles to said first axis;

an eccentric cam means on said tool adjuster operatively engaging said positive drive, whereby with said collet released, selective adjustment of said tool adjuster effects corresponding longitudinal adjustments of said positive drive within said body, and corresponding longitudinal adjustments of said tool; and further comprising said positive drive having a wedge shaped aperture at one end with said tool at one end nested within said aperture.

7. In the tool holder of claim 6, further comprising the inner end of said cutting tool being rectangular.

* * * * *